(12) United States Patent
Engstrom et al.

(10) Patent No.: US 11,524,584 B2
(45) Date of Patent: Dec. 13, 2022

(54) CURRENT COLLECTOR ARRANGEMENT FOR A VEHICLE AND A VEHICLE THEREFORE

(71) Applicant: VOLVO TRUCK CORPORATION, Gothenburg (SE)

(72) Inventors: Sten Engstrom, Härryda (SE); Richard Sebestyen, Torslanda (SE); Mikaela Öhman, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 889 days.

(21) Appl. No.: 16/333,909

(22) PCT Filed: Sep. 30, 2016

(86) PCT No.: PCT/EP2016/073459
§ 371 (c)(1),
(2) Date: Mar. 15, 2019

(87) PCT Pub. No.: WO2018/059709
PCT Pub. Date: Apr. 5, 2018

(65) Prior Publication Data
US 2019/0202295 A1    Jul. 4, 2019

(51) Int. Cl.
*B60L 5/36* (2006.01)
*B60L 5/38* (2006.01)
*B60L 5/12* (2006.01)

(52) U.S. Cl.
CPC .............. *B60L 5/36* (2013.01); *B60L 5/38* (2013.01); *B60L 5/12* (2013.01)

(58) Field of Classification Search
CPC .................. B60L 5/12; B60L 5/36; B60L 5/38
See application file for complete search history.

(56) References Cited

U.S. PATENT DOCUMENTS 3,924,084 A    12/1975 Lindfors
4,129,203 A    12/1978 Berman
(Continued)

FOREIGN PATENT DOCUMENTS

| CN | 102490619 A | 6/2012 |
|---|---|---|
| EP | 0297575 A2 | 1/1989 |
| GB | 1247776 A | 9/1971 |
| JP | H0739007 A | 2/1995 |
| WO | 2011046407 A2 | 4/2011 |
| WO | 16/002302 A1 | 1/2016 |

OTHER PUBLICATIONS

International Search Report dated May 19, 2017 in International Application No. PCT/EP2016/073459.
(Continued)

*Primary Examiner* — Zachary L Kuhfuss
(74) *Attorney, Agent, or Firm* — Venable LLP; Jeffri A Kaminski

(57) ABSTRACT

The invention relates to a current collector arrangement arranged to be mounted on a vehicle and to transmit electric power between a current conductor (130; 230; 330; 430; 530) located in the surface of a road and the vehicle, wherein the current collector arrangement comprises a current collector arm (150; 250; 350; 450; 550; 650; 750; 850; 950; 1050) that is arranged to be controllable for at least vertical displacement relative to a longitudinal axis of the vehicle, in order to position the current collector arm relative to the current conductor (130; 230; 330; 430; 530). The current collector arrangement comprises controllable actuators arranged to effect at least the vertical displacement the current collector arm (150; 250; 350; 450; 550; 650; 750; 850; 950; 1050). A first actuator (481; 581; 681; 781; 881; 981; 1081) is arranged to lower the current collector arm from a retracted position into a deployed position, and a second actuator (482; 582; 682; 782; 882; 982; 1082) is arranged to lift the current collector arm from the deployed position into the retracted position. During a vertical displacement effected by one of the first or second actuators, the other actuator is arranged to act as a damper.

20 Claims, 9 Drawing Sheets

(56) References Cited

U.S. PATENT DOCUMENTS

| | | | |
|---|---|---|---|
| 5,115,405 A * | 5/1992 | Cathala | B60L 5/32 |
| | | | 700/275 |
| 5,709,292 A | 1/1998 | Breitbach et al. | |
| 5,821,728 A * | 10/1998 | Schwind | H01M 10/44 |
| | | | 320/108 |
| 6,374,971 B1 * | 4/2002 | Siciliano | B60L 5/42 |
| | | | 191/18 |
| 10,960,770 B2 * | 3/2021 | Ichikawa | B60L 11/182 |
| 11,034,252 B2 * | 6/2021 | Barnes | B60L 53/60 |
| 2014/0138200 A1 | 5/2014 | Dronnik et al. | |
| 2016/0114687 A1 * | 4/2016 | Ichikawa | H02J 7/025 |
| | | | 701/22 |
| 2019/0202295 A1 * | 7/2019 | Engstrom | B60L 5/36 |
| 2020/0290482 A1 * | 9/2020 | Jones | B60M 1/02 |

OTHER PUBLICATIONS

Written Opinion dated May 19, 2017 in International Application No. PCT/EP2016/073459.
Office Action dated Apr. 9, 2020 in EP Application No. 16775248.4, 5 pages.
Alotta, B. et al., "An active suspension system for railway pantographs: the T2006 prototype", XP055682833, Proc. IMechE, vol. 223, Part F: J. Rail and Rapid Transit, Jun. 6, 2008, 15 pages.
Chinese Office Action dated Mar. 25, 2022 in corresponding Chinese Patent Application No. 201680089617.2, 9 pages.

\* cited by examiner

CURRENT COLLECTOR ARRANGEMENT FOR A VEHICLE AND A VEHICLE THEREFORE

TECHNICAL FIELD

The invention relates to a current collector arrangement in a vehicle using an electric road system (ERS) and a vehicle operated using this current collector arrangement.

The invention can be applied in vehicles in general, such as automobiles, light and heavy trucks, buses and construction equipment. Although the invention will be described with respect to a commercial vehicle, the invention is not restricted to this particular vehicle, but may also be used in heavy-duty vehicles such as working machines in the form of articulated haulers.

BACKGROUND

Vehicles travelling on an electric road system (ERS) are provided with a current collector arrangement arranged to transmit electric power from a current conductor located in the road surface to the vehicle for driving the vehicle or for charging an electrical storage means, such as a high voltage battery onboard the vehicle. The current conductor is a charging surface that can comprise a pair of parallel tracks extending along the electric road, which tracks can supply direct current (DC) to the vehicle via the current collector arrangement.

Current collector arrangements usually comprise a retractable arm with an attached pick-up unit that can be deployed into contact with a current conductor by means of an actuator. Actuators used for this purpose are quite different form actuators used in pantographs for overhead wires. Current collector arrangements for ERS vehicles must perform a controlled movement during deployment into contact with the current conductor while the vehicle is being driven. The current collector arrangement must also be able to hold the pick-up unit in contact with the current conductor during power transmission to avoid arcing. Simultaneously the current collector arrangement must be ready to retract the pick-up unit if an obstacle is detected on the road, in order to prevent damage to the current collector arrangement.

The invention aims to provide an improved current collector arrangement that can perform a controlled displacement of a current collector arm with an attached pick-up unit during both deployment and retraction.

SUMMARY

An object of the invention is to provide a vehicle current collector arrangement, which arrangement allows improved control of the deployment and retraction of a current collector.

The object is achieved by a current collector arrangement and a vehicle comprising such a current collector arrangement according to the appended claims.

In the subsequent text the wording "electric road system" will be described by the abbreviation ERS. An ERS can encompass a conductive system or an inductive system. Conductive systems require direct contact between a conductor comprising two parallel rails and a corresponding collector in order to transfer DC power. Inductive systems use electromagnetic transmission coils embedded in the road surface and reception coils in the vehicle which coils are electrically resonant, so that they convert the magnetic flux above the road into electrical energy for use in the vehicle, wherein the energy can be used to charge batteries or drive electric motors in the vehicle.

In the text, the wording "current collector arrangement" is used as a collective term for an arrangement that is suitable for transferring electrical power from a source of electrical energy in or on a road surface. A current collector arrangement of this type comprises a current collector, also referred to as a pick-up or a similar device. In a conductive system the current collector is arranged to be placed in contact with a current conductor. In an inductive system the current collector is arranged to be located separate from the current conductor in a position where electrical energy can be transmitted inductively. The current collector is attached to the vehicle via a controllable assembly that allows the current collector to be at least vertically and optionally also transversely displaced relative to the vehicle. The displacement can be achieved, for instance, by a collector arm that can be pivoted vertically about a horizontal pivot joint towards the road surface and transversely in an arc about a vertical pivot joint, or by a holder displaced vertically along a first guide and transversely about a second guide mounted transversely to the vehicle. Consequently, when it is stated that the current collector is displaced to track a current conductor, this intended to mean that the arrangement is displaced to allow the current collector component of a conductive current collector arrangement to be placed in contact with and follow a current conductor in the road surface. In the case of an inductive current collector arrangement the current collector component is displaced to follow the current conductor at a desired distance above the road surface. When used in the context of a conductive system, a "current conductor" comprises two parallel rails or similar which are contacted by a pick-up unit comprising a pair of corresponding current conducting contact elements. When used in the context of an inductive system, a "current conductor" comprises electromagnetic transmission coils, or primary coils, embedded in or below the road surface, wherein electrically resonant reception coils, or secondary coils, in a current collector pick-up unit on the vehicle are used for converting the magnetic flux above the coils in the road into electrical energy. Alternative suitable types of conductive or inductive energized surfaces, other than those described in the text of the application can also be used within the scope of the invention. For instance, a conductive surface located in a recess or similar in the road surface may also be used.

The invention relates to a current collector arrangement for an electric road system (ERS) and aims to overcome problems relating to controlling the current collector arrangement during deployment and retraction, as well as during power transmission. The invention involves the use of a number of actuators for displacing a current collector arm, wherein the current collector arm is primarily deployed after the vehicle has entered an ERS road and is retracted prior to the vehicle leaving an ERS road. For conducting systems, the power transmission is controlled to prevent arcing when deploying and retracting the current collector arm and its pick-up unit. This involves inhibiting the power in the current collector arrangement immediately prior to deployment or contact and retraction. For inducting systems, the power transmission is controlled by the distance between the primary and secondary coils and there is no risk of arcing during deployment and retraction.

According to a first aspect of the invention, the object is achieved by a current collector arrangement arranged to be mounted on a vehicle and to transmit electric power between a current conductor located in the surface of a road and the vehicle, wherein the current collector arrangement comprises a current collector arm that is arranged to be controllable for at least vertical displacement relative to a longitudinal axis of the vehicle, in order to position the current collector arm to allow power transmission from the current conductor. The current collector arrangement comprises controllable actuators arranged to effect at least the vertical displacement of the current collector arm and an electronic control unit for controlling at least power transmission in and displacement of the current collector arm. The current collector arrangement further comprises a first actuator arranged to lower the current collector arm from a retracted position into a deployed position where electric power can be transmitted from the current conductor to the current collector and a second actuator arranged to lift the current collector arm from the deployed position into the retracted position. During a vertical displacement effected by one of the first or second actuators, the other actuator is arranged to act as a damper. This current collector arrangement can be used for both conductive and inductive power transmission, as outlined below.

According to a first alternative aspect of the invention, the object is achieved by a conductive current collector arrangement arranged to be mounted on a vehicle and to convert and transmit electric power between a current conductor located in the surface of a road and the vehicle. The current conductor is preferably, but not necessarily located in a predetermined transverse position in the longitudinal direction of the road surface. The vehicle is provided with means for detecting and/or locating the position of the current conductor relative to the vehicle and/or suitable road markers on or along the road. Locating means of this type is used by but is not part of the arrangement according to the current invention and will not be described in further detail here. A vertical displacement is performed in order to place a portion of the current collector arrangement in contact with the current conductor, in order to effect transmission of current, and to retract the current collector arrangement, when the current transmission has been interrupted. The current collector arrangement comprises a number of controllable actuators arranged to effect at least the vertical displacement of the current collector arm and an electronic control unit for controlling at least power transmission in and displacement of the current collector arm.

The current collector arrangement further comprises a first actuator arranged to lower the collector arm from a retracted position into a deployed position in contact with the current conductor. The current collector arrangement further comprises a second actuator arranged to lift the collector arm from the deployed position into the retracted position. During a vertical displacement performed by one of the first or second actuators the other actuator is arranged to act as a damper. Accordingly, when the first actuator is controlled to deploy the collector arm, the second actuator is operated as a damper to absorb oscillations in the arm movement. Similarly, when the second actuator is controlled to retract the collector arm, the first actuator is operated as a damper. An advantage of this arrangement is that it can be used for absorbing oscillations of a current collector arm supporting a current collecting pick-up unit during displacement. Oscillations or other sudden movements/jerks can be induced into the current collector arrangement by movement of the vehicle chassis by vibrations in the wheel suspension, for instance caused by an irregular or uneven road surface. By dampening such oscillations, it is possible to minimize sudden loads on the current collector arm and its attachments, and to reduce the transmission of such oscillations into the frame of the vehicle. In the case of a fluid actuator, a suitable damping can be achieved by means of a fixed or variable throttle associated with the actuator that is not being operated. In the case of an electric actuator a suitable damping can be achieved by operating the non-actuated actuator in a generator mode to create a resistance to sudden or oscillating movements. During power transmission the first actuator maintains a predetermined contact pressure on the current collector arrangement to ensure contact, even if the vehicle chassis moves in the vertical direction during travel.

A current collector arrangement according to the invention is provided with a current collector arm that comprises a longitudinal component having a horizontal pivot joint at a first end and a pick-up unit at a second end. The controllable actuators arranged to effect at least the vertical displacement the current collector arm can be located in a number of suitable positions. According to a first example, the current collector arm comprises an attachment point for at least one actuator intermediate the first and second ends. In this example the first and second actuators can both be located between the first and second ends of the current collector arm, either in line or side by side relative to the main longitudinal extension of the current collector arm.

According to a second alternative aspect of the invention, the object is achieved by an inductive current collector arrangement arranged to be mounted on a vehicle and to convert and transmit electric power between a current conductor comprising electromagnetic transmission coils located in the surface of a road and the vehicle. The current conductor is preferably, but not necessarily located in a predetermined transverse position in the longitudinal direction of the road surface. The vehicle is provided with means for detecting and/or locating the position of the current conductor relative to the vehicle and/or suitable road markers on or along the road. Locating means of this type is used by but is not part of the arrangement according to the current invention and will not be described in further detail here. A vertical displacement is performed in order to position a portion of the current collector arrangement at a predetermined distance from the current conductor above the road surface, in order to effect transmission of current, and to retract the current collector arrangement, when the current transmission has been interrupted. The current collector arrangement comprises a number of controllable actuators arranged to effect at least the vertical displacement of the current collector arm and an electronic control unit for controlling at least power transmission in and displacement of the current collector arm. In operation, the predetermined distance between the current collector arrangement and the current conductor can be selected, depending on one or more operating conditions, such as vehicle speed, vehicle loading, road condition or similar parameters. The predetermined distance is measured from the road surface to the underside of a pick-up unit on the current collector arm. This distance is also referred to as the ride height of the pick-up unit.

The current collector arrangement further comprises a first actuator arranged to lower the collector arm from a retracted position into a deployed position a predetermined distance above the current conductor. The current collector arrangement further comprises a second actuator arranged to lift the collector arm from the deployed position into the retracted position. During a vertical displacement performed by one of the first or second actuators the other actuator is arranged to act as a damper. Accordingly, when the first actuator is controlled to deploy the collector arm, the second actuator is operated as a damper to absorb oscillations in the arm movement. The second actuator can also be operated as a damper when the first actuator is controlled to maintain a predetermined height of the collector arm above the road surface. When the second actuator is controlled to retract the collector arm, the first actuator is operated as a damper.

An advantage of this arrangement is that it can be used for absorbing oscillations of a current collector arm supporting a current collecting pick-up unit during displacement. Oscillations or other sudden movements/jerks can be induced into the current collector arrangement by movement of the vehicle chassis by vibrations in the wheel suspension, for instance caused by an irregular or uneven road surface. By dampening such oscillations, it is possible to minimize sudden loads on the current collector arm and its attachments, and to reduce the transmission of such oscillations into the frame of the vehicle. In the case of a fluid actuator, a suitable damping can be achieved by means of a fixed or variable throttle associated with the actuator that is not being operated. In the case of an electric actuator a suitable damping can be achieved by operating the non-actuated actuator in a generator mode to create a resistance to sudden or oscillating movements.

In the case of an inductive current collector arm the ride height of the pick-up unit above the road surface can be varied with vehicle speed. During periods of stand-still, the pick-up unit can be lowered to a predetermined minimum height that is optimal for inductive charging. The predetermined height can be increased with increasing speed, as a relatively higher speed will cause larger oscillations. In this way it is possible to prevent the pick-up unit from striking the road surface, e.g. when travelling on uneven roads. The ride height of the pick-up unit can also be adjusted depending on detected vehicle parameters, such as variations in vehicle weight after loading or unloading cargo, or detected road parameters. Other types of detected objects, such as speed bumps or unexpected obstacles, that could cause damage to the pick-up unit will cause the second actuator to retract the current collector arm. The current ride height can be determined by a number of commercially available sensors. The output signal of such a sensor can be used to determine the current ride height and for controlling the actuators.

A current collector arrangement according to the second alternative aspect of the invention is provided with a current collector arm that comprises a longitudinal component having a horizontal pivot joint at a first end and a pick-up unit at a second end. The controllable actuators arranged to effect at least the vertical displacement the current collector arm can be located in a number of suitable positions. As in the first example described above, the current collector arm comprises an attachment point for at least one actuator intermediate the first and second ends. In this case the first and second actuators can both be located between the first and second ends of the current collector arm, either in line or side by side relative to the main longitudinal extension of the current collector arm.

According to a second example, the current collector arm comprises an attachment point for at least one actuator on the opposite side of the horizontal pivot joint relative to the other actuator. In this example the first and second actuators can be located in contact with an extension of the current collector arm on the other side of the pivot joint relative to the second end of the current collector arm. The extension of the current collector arm can extend in the longitudinal axis of the main part of the arm, or be arranged at a suitable angle relative to the main part of the arm. This angle can be selected depending on the available packaging space for the actuators. For instance, if vertical space is limited then the extension can be arranged at right angles to the longitudinal direction of the current collector arm, allowing a substantially horizontal placement for at least the first and second actuators.

According to a third example, the current collector arm comprises attachment points for an actuator on opposite sides of the horizontal pivot joint. In this example the first actuator can be located intermediate the first and second ends of the current collector arm, while the second actuator can be located in contact with an extension of the current collector arm on the other side of the pivot joint, or vice versa.

According to the invention at least one of the first and second actuators can be a fluid actuator, such as a pneumatic or hydraulic actuator. Alternatively, at least one of the actuators can be an electric actuator. The selection of suitable actuators can be made on the basis of factors such as size and weight of the current collector arm, expected oscillation forces to be dampened, available power sources on the vehicle, etc. For instance, in a commercial transport vehicle the preferred actuator would be pneumatic, as compressed air is usually available in this type of vehicle. Also, pneumatic actuators would be advantageous in this case due to the dampening forces required to handle the size and weight of a current collector arm used in this type of vehicle.

In the above examples, the relative positioning of the first and second actuators can be based on factors such as available space for the size of actuator used for deployment and retraction. For instance, the first actuator is assisted by gravity during deployment of the current collector arm. In the case of a conductive current collector arm it must be able to maintain a contact pressure of, for example, 50-100 kg in order to ensure electrical contact and to avoid arcing that would damage the pick-up unit and/or the current conducting rails.

In the case of an inductive current collector arm there is no contact pressure requirement. However, the ride height of the pick-up unit above the road surface can be varied with vehicle speed, vehicle load, road surface state, etc. Hence the first actuator must be able to maintain the pick-up unit at a set height and to counteract oscillation induced movement, with the dampening assistance of the other actuator, to avoid damage to the pick-up unit.

Similarly, the second actuator must be able to retract the current collector arm sufficiently quickly to avoid detected obstacles, as well as maintain the current collector arm in the retracted position. In order to assist the second actuator, a suitable mechanism can be used to support or lock the current collector arm in the retracted position during travel on non-ERS roads.

As indicated above, the current collector arm and its pick-up unit must be placed into contact with a current conductor in the road surface. According to one example, the current collector arm is only arranged for vertical displacement, wherein the positioning of the pick-up unit relative to the current conductor must be performed by steering the vehicle. This is not an optimal solution as the driver must focus on following the current conductor, which may take attention away from events in the surrounding traffic.

Hence it is preferred that the current collector arm is arranged to be controllable for vertical and transverse displacement relative to the longitudinal axis of the vehicle. According to an alternative example the current collector arrangement can comprise a third actuator to displace the collector arm in the transverse direction to track the current conductor. The third actuator can be attached to the frame or a similar fixed point of the vehicle in order to displace the current collector arm together with the first and second actuators. In this way the current collector arm and the pick-up unit can be controlled in both the vertical and the transverse direction to contact and to follow the current conductor. Vehicles of this type can be provided with tracking means to allow the current collector to track and follow the current conductor. The vehicle can be steered by a driver who will need to maintain a relatively steady course along the road or lane, as the tracking means has a limited transverse displacement range. Alternatively, the vehicle can be steered by a suitable autonomous lane keeping means to maintain a desired course along the ERS road. Tracking devices of this type can be used for both conductive and inductive systems.

According to a first example the third actuator is arranged to displace the collector arm about a vertical axis. The third actuator can be a rotary actuator arranged to act on the collector arm via a gear arrangement, such as a bevel gear arrangement, or a rotary actuator with a drive axle arranged in line with the vertical axis. A vertical plane through the vertical axis for transverse displacement can preferably, but not necessarily, intersect the horizontal axis of the pivot joint. In operation the third actuator will cause the current collector arm to pivot about the vertical axis, causing the pick-up unit located remote from the vertical axis to move in an arc in order to follow the current conductor.

According to a second example the third actuator is arranged to displace the collector arm along a guide arrangement at right angles to the longitudinal axis of the vehicle. The third actuator can be a rotary actuator arranged to act on the collector arm via a gear arrangement, such as a rack-and-pinion gear arrangement, or by means of a suitable linear actuator. A vertical plane through the guide for transverse displacement can preferably, but not necessarily, intersect the horizontal axis of the pivot joint. In operation the third actuator will cause the current collector arm to be displaced along the transverse guide, causing the pick-up unit located remote from the guide to move transversely across the surface of the road in order to follow the current conductor.

According to the invention, the third actuator described in the examples above can be a fluid actuator, such as a pneumatic or hydraulic actuator or an electric actuator. The selection of the type of actuator and its positioning on the vehicle can be based on factors such as available space for the size of actuator used for rotation or transverse displacement.

The present invention also relates to a vehicle comprising a conductive or inductive current collector arrangement as described above. Although the invention will be described with respect to a commercial vehicle, such as a truck or a bus, the invention is not restricted to this particular vehicle, but may also be used in a heavy-duty vehicle or in construction equipment, such as a working machine in the form of an articulated hauler.

An advantage of the current collector arrangement according to the invention is that it can be used for absorbing oscillations of a current collector arm supporting a current collecting pick-up unit during displacement. Oscillations or other sudden movements/jerks can be induced into the current collector arrangement by movement of the vehicle chassis by vibrations in the wheel suspension, for instance caused by an irregular or uneven road surface. In addition, the use of separate actuators for deployment and retraction allows each actuator to be given predetermined desired properties. For instance, the actuator used for deployment does not necessarily be particularly rapid, but will need to provide sufficient force to maintain the pick-up unit in contact with the current conductor. The actuator used for retraction can be selected to provide rapid displacement in order to retract the pick-up unit quickly if an obstacle is detected. Even if actuators having different properties are selected, any one actuator may be used as a damper when the other actuator is operated.

Further advantages and advantageous features of the invention are disclosed in the following description and in the dependent claims.

BRIEF DESCRIPTION OF THE DRAWINGS

In the following text, the invention will be described in detail with reference to the attached drawings. These schematic drawings are used for illustration purposes only and do not in any way limit the scope of the invention. In the drawings.

DETAILED DESCRIPTION OF EXAMPLE EMBODIMENTS OF THE INVENTION

Figure 1:
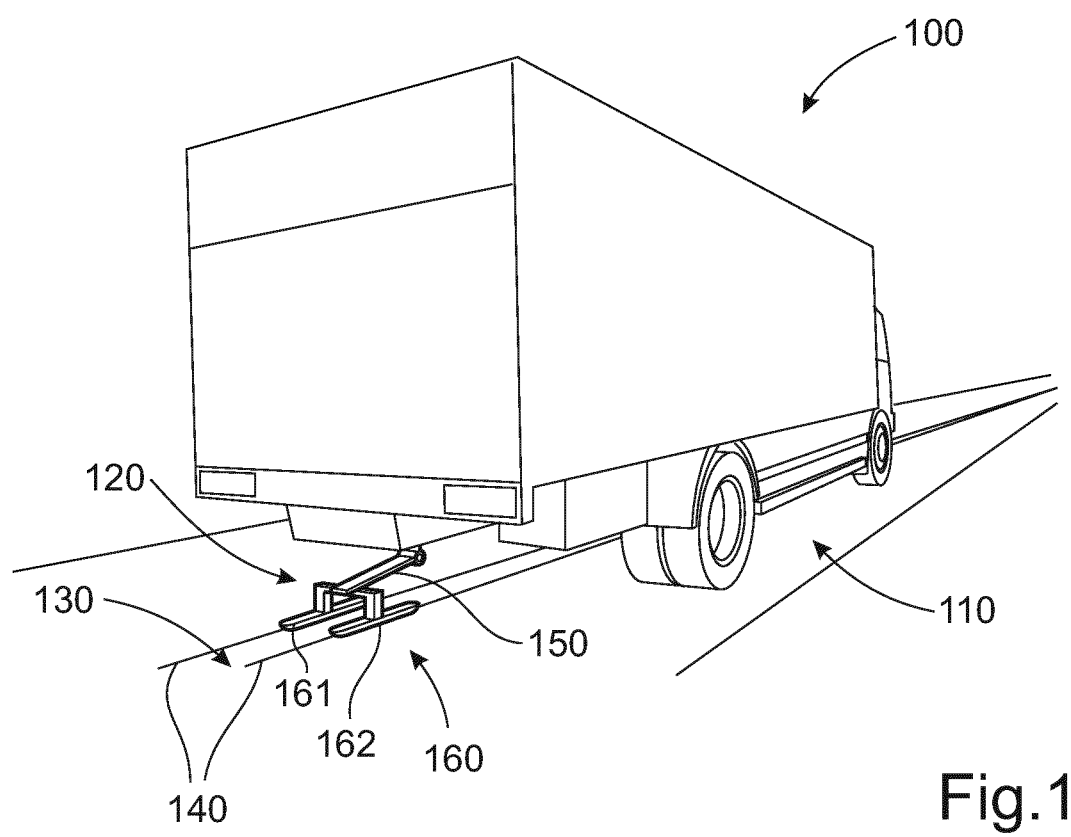
FIG. 1 shows a schematic vehicle comprising a current collector arrangement according to the invention travelling on an electric road system.

FIG. 1 shows a schematic electric road system (ERS) where a vehicle 100 is travelling on a road 110 provided with means for supplying electric current to the vehicle 100. The vehicle 100 is provided with a current collector arrangement 120 which can be lowered into contact with a current conductor 130 comprising parallel current conducting rails 140 located in the surface of the road 110. The vehicle can be an electric vehicle or a hybrid electric vehicle.

The current collector arrangement 120 comprises a current collector arm 150 arranged to be displaced between a retracted, inactive first position and an operative second position. The current collector arm 150 and a pick-up unit 160 with a pair of contact elements 161, 162 are lowered into contact with the current conductor 130 using suitable actuators (not shown). FIG. 1 shows the current collector arm 150 in its operative position. Actuators are provided for moving the current collector arm 150 at least in the vertical direction of the vehicle 100.

In this context the current collector arrangement will be described as comprising a displaceable current collector arm for the pick-up unit, which arm can be displaced vertically either in a straight line or in an arcuate path relative to a pivot with a horizontal axis on the vehicle. The positioning means for such an arm can also comprise actuator means for displacing the arm in the transverse direction of the vehicle, either in a transverse straight line or in an arcuate path relative to a pivot with a vertical axis on the vehicle. Alternatively, the transverse positioning means can comprise suitable control means connected to an electronically controllable steering system in the vehicle, wherein lateral positioning of the vehicle relative to the electrical conductor can be performed using a pair of steerable wheels. Positioning can further be performed using a combination of the above means, for instance if the vehicle must be displaced in the lateral direction to bring the current conductor within the transverse range of the displaceable arm carrying the current collector. The design of the current collector arrangement will be described in further detail below.

Figure 2A:
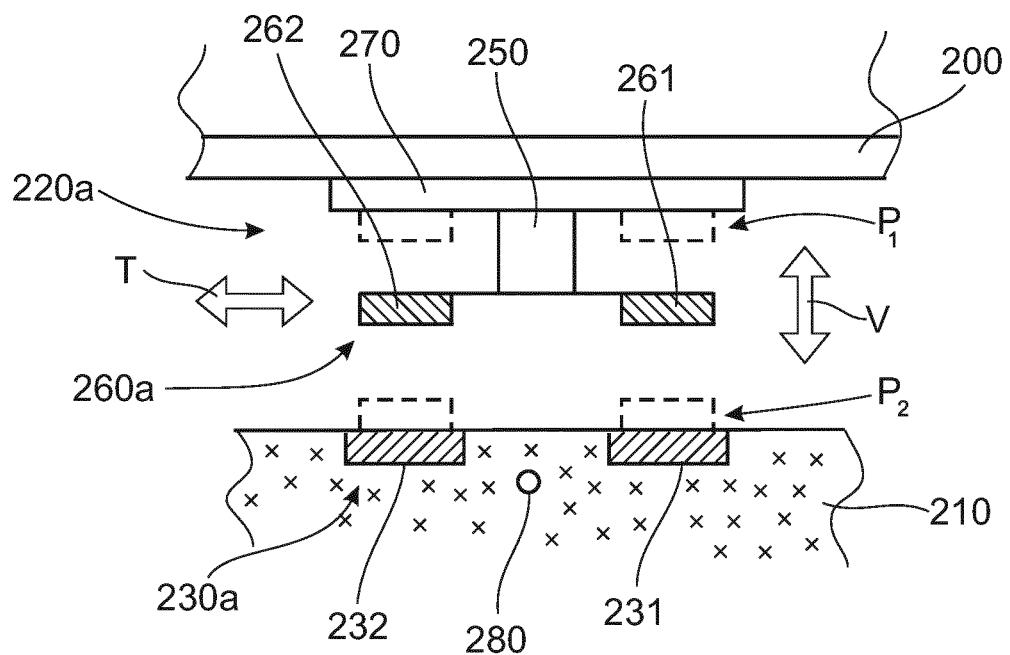
FIG. 2A shows a schematic front view of a current collector arrangement according to the invention.

FIG. 2A shows a schematic front view of a conductive current collector arrangement 220a according to one example of the invention. The current collector arrangement 220a is mounted on a schematically indicated vehicle 200 located over a schematic section of a road 210. A current conductor 230a comprising a first and a second power rail 231, 232 for supplying DC current is located in the surface of the road 210. The current collector arrangement 220a comprises a current collector arm 250 and a pick-up unit 260a with a pair of contact elements 261, 262 for collecting current from the respective first and a second power rails 231, 232. The current collector arm 250 is attached to a vertical positioning means (not shown) for displacing the current collector arm 250 from a retracted first position P1 adjacent the vehicle 200 to an active second position P2 in contact with the current conductor 230a. The deployment is carried out by a first actuator (not shown), which will also maintain a desired contact pressure between the contact elements 261, 262 and the power rails 231, 232. A second actuator (not shown) is actuated to retract the current collector arm 250. The vertical positioning means will be described in connection with FIGS. 4-10 below. The vertical displacement is indicated by the arrow V. The lowering of the current collector arm 250 into the active, second position is performed when its detected that the first and second contact elements 261, 262 are vertically aligned with their respective first and second power rails 231, 232. The current collector arm 250 is attached to the vehicle 200 via a horizontal, or transverse, positioning means 270 for displacing the current collector arm 250 in a transverse direction.

In FIG. 2A the current collector arm 250 is shown in an intermediate position during displacement towards the second position P2. Prior to lowering the current collector arm 250 into the second position P2 it is necessary to locate and track the current conductor 230a. According to the example in FIG. 2A, locating and tracking the current conductor 230a can be performed by using one or more vertical antennas (not shown) used for detecting the position of a signal cable 280 located between or adjacent the current conductor 230a. However, the invention is not limited to this method of locating the current conductor.

In the example shown in FIG. 2, the current collector arm 250 and the vertical positioning means are attached to a transverse positioning means 270. The vertical positioning means is arranged to displace the current collector arm 250 and the pick-up unit 260a in the vertical direction of the vehicle 200 as indicated by the arrow V. The horizontal positioning means 270 is arranged to displace the current collector arm 250 and the pick-up unit 260a in the transverse direction of the vehicle 200 as indicated by the arrow T. The transverse positioning means 270 is controlled to displace the current collector arm 250 in the transverse direction of the vehicle 200, initially to locate and subsequently to track the current conductor 230a. Tracking is performed to maintain the first and second contact elements 261, 262 in vertical alignment with their respective first and second power rails 231, 232.

Figure 2B:
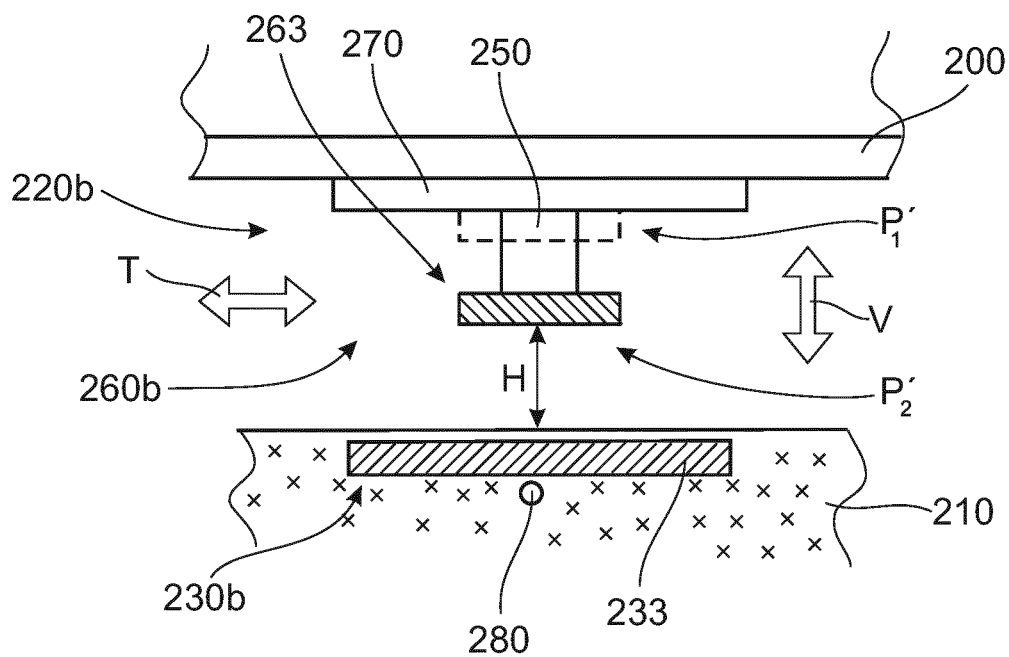
FIG. 2B shows a schematic front view of an alternative current collector arrangement according to the invention.

FIG. 2B shows a schematic front view of an alternative current collector arrangement 220b according to the invention. While FIG. 2A shows a conductive current collector, FIG. 2B shows an inductive current collector. The current collector arrangement 220b is mounted on a schematically indicated vehicle 200 located over a schematic section of a road 210. A current conductor 230b comprising a primary induction coil 233 for supplying DC current is located in the surface of the road 210. The current collector arrangement 220b comprises a current collector arm 250 and a pick-up unit 260b with a secondary induction coil 263 for collecting current from the primary induction coil 233. The current collector arm 250 is attached to a vertical positioning means (not shown) for displacing the current collector arm 250 from a retracted first position P1' adjacent the vehicle 200 to an active second position P2' at a predetermined distance, or ride height H from the current conductor 230b above the surface of the road 210.

In operation, the predetermined distance H between the current collector arrangement 220b and the current conductor 230b can be selected, depending on vehicle speed, vehicle loading, or similar parameters. During periods of stand-still, the pick-up unit can be lowered to and maintained at a predetermined minimum height that is optimal for inductive charging by a first actuator (not shown). The predetermined height can be increased with increasing speed, as a relatively higher speed will cause larger oscillations. Should any unexpected obstacles large enough to cause damage to the pick-up unit be detected, then a second actuator (not shown) is actuated to retract the current collector arm. The predetermined distance is measured from the road surface to the underside of the secondary induction coil 263 on the current collector arm. The first and second actuators making up the vertical positioning means will be described in connection with FIGS. 4-10 below. The vertical displacement is indicated by the arrow V. The lowering of the current collector arm 250 into the active, second position is performed when it is detected that the secondary induction coil 263 is vertically aligned with the primary induction coil 233. The current collector arm 250 is attached to the vehicle 200 via a horizontal, or transverse, positioning means 270 for displacing the current collector arm 250 in a transverse direction.

In FIG. 2B the current collector arm 250 is shown in an intermediate position during displacement towards the second position P2'. Prior to lowering the current collector arm 250 into the second position P2' it is necessary to locate and track the current conductor 230b. According to the example in FIG. 2B, locating and tracking the current conductor 230b can be performed by using one or more vertical antennas (not shown) used for detecting the position of a signal cable 280 located between or adjacent the current conductor 230b. However, the invention is not limited to this method of locating the current conductor.

In the example shown in FIG. 2B, the current collector arm 250 and the vertical positioning means are attached to a transverse positioning means 270. The vertical positioning means is arranged to displace the current collector arm 250 and the pick-up unit 260b in the vertical direction of the vehicle 200 as indicated by the arrow V. The horizontal positioning means 270 is arranged to displace the current collector arm 250 and the pick-up unit 260b in the transverse direction of the vehicle 200 as indicated by the arrow T. The transverse positioning means 270 is controlled to displace the current collector arm 250 in the transverse direction of the vehicle 200, initially to locate and subsequently to track the current conductor 230b. Tracking is performed to maintain the secondary induction coil 263 in vertical alignment with the primary induction coil 233.

Figure 3:
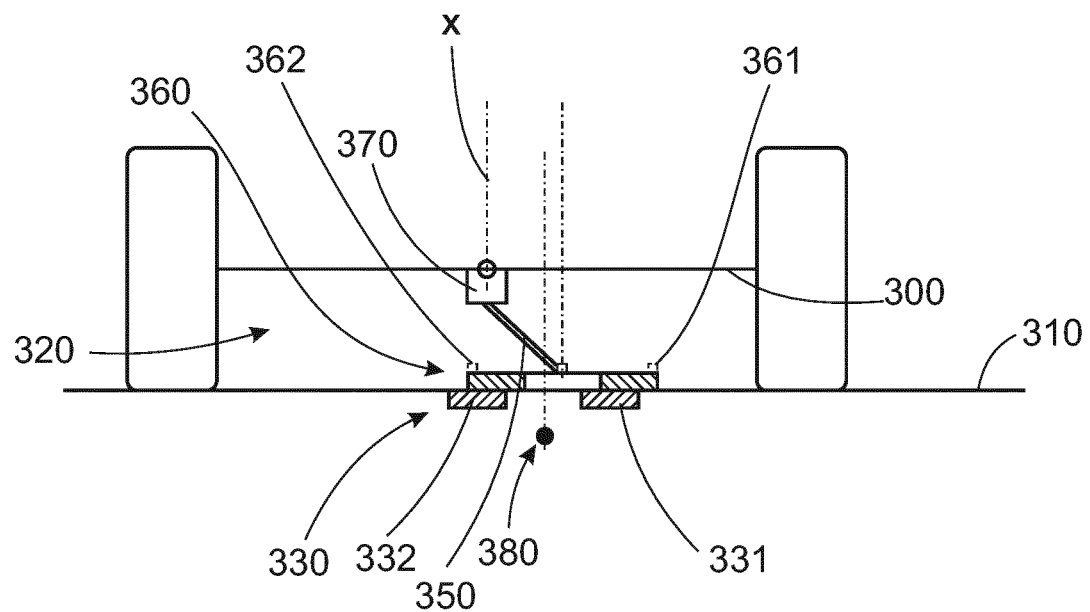
FIG. 3 shows a schematic front view of an alternative current collector arrangement according to the invention.

FIG. 3 shows a schematic front view of an alternative current collector arrangement 320 according to the invention. The current collector arrangement 320 is mounted on a schematically indicated vehicle 300 located over a schematic section of a road 310. A current conductor 330 comprising a first and a second power rail 331, 332 for supplying DC current is located in the surface of the road 310. The current collector arrangement 320 comprises a current collector arm 350 and a pick-up unit 360 with a pair of contact elements 361, 362 for collecting current from the respective first and a second power rails 331, 332. The current collector arm 350 is attached to a vertical positioning means (not shown) for displacing the current collector arm 350 from a retracted first position adjacent the vehicle 300 to an active second position (indicated in the figure) in contact with the current conductor 330. The lowering of the current collector arm 350 into the active, second position is performed when its detected that the first and second contact elements 361, 362 are vertically aligned with their respective first and second power rails 331, 332. The current collector arm 250 is attached to the vehicle 300 via a pivoting means 370 for displacing the current collector arm 250 about a vertical axis X. During this displacement the pick-up unit 360 will be moved along an arcuate path relative to the vertical axis X on the vehicle 300.

Figure 4:
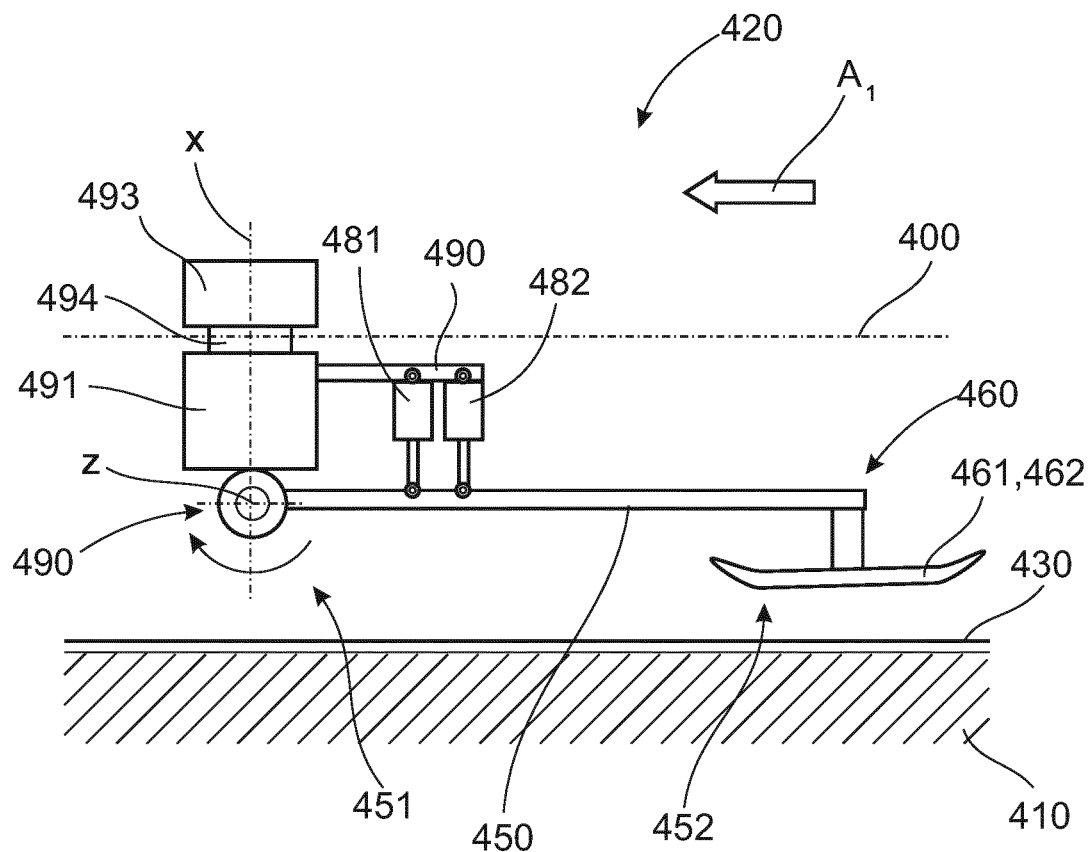
FIG. 4 shows a schematic side view of a current collector arrangement according to a first embodiment of the invention.

FIG. 4 shows a schematic side view of a current collector arrangement according to a first embodiment of the invention. FIG. 4 shows a current collector arrangement 420 arranged to be mounted on a schematically indicated vehicle 400 and to transmit electric power between a current conductor 430 located in the surface of a road 410 and the vehicle 400. The current conductor is preferably, but not necessarily located in a predetermined transverse position in the longitudinal direction of the road surface. The vehicle 400 is provided with means (not shown) for detecting and/or locating the position of the current conductor 430 relative to the vehicle and/or suitable road markers on or along the road. The current collector arrangement 420 comprises a displaceable current collector arm 450 that is arranged to be controllable for vertical and transverse displacement relative to a longitudinal axis of the vehicle 400. The longitudinal axis of the vehicle 400 extends in the main direction of forward movement of the vehicle, indicated by an arrow A1. A vertical downwards displacement is performed in order to place a pick-up unit 460 comprising contact elements 461, 462 mounted on a free end of the current collector arm 450 into contact the current conductor 430, in order to effect transmission of current. A vertical upwards displacement is performed in order to retract the current collector arm 450, when the current transmission has been interrupted. The current collector arrangement 420 comprises a first and a second controllable actuator 481, 482 arranged to effect the vertical displacement the current collector arm 450 and an electronic control unit (not shown) for controlling at least power transmission in and displacement of the current collector arm 450. The control unit is arranged to detect when the vehicle enters or leaves an ERS road and to initiate the power transmission after a completed deployment of the current collector arm 450 and to interrupt the power transmission prior to retraction of the current collector arm 450.

The first actuator 481 is arranged to lower the current collector arm 450 from a retracted position into a deployed position in contact with the current conductor 430. The second actuator 482 is arranged to lift current collector arm 450 from the deployed position into the retracted position. During a vertical displacement performed by one of the first or second actuators 481, 482 the other actuator 482, 481 is arranged to act as a damper. Accordingly, when the first actuator 481 is controlled to deploy the collector arm 450, the second actuator 482 is operated as a damper to absorb oscillations in the arm movement. Similarly, when the second actuator 482 is controlled to retract the collector arm 450, the first actuator 481 is operated as a damper. This arrangement is used for absorbing oscillations of the current collector arm 450 supporting the current collecting pick-up unit 460 during displacement.

The current collector arrangement 420 according to the first embodiment of the invention is provided with a current collector arm 450 that comprises a longitudinal component having a horizontal pivot joint 490 at a first end 451 and a pick-up unit at a second end 452. The controllable actuators 481, 482 arranged to effect the vertical displacement the current collector arm 450 are located intermediate the first and second ends 451, 452. In this example the first and second actuators 481, 482 are located in line between the first and second ends of the current collector arm. Alternatively, the actuators can be located side by side relative to the main longitudinal extension of the current collector arm.

The pivot joint 490 is attached to the lower end of a base member 491 that is attached to the vehicle and is rotatable about a vertical axis X. A support member 492 is attached to the upper end of the base member 491. The controllable actuators 481, 482 are attached between the support member 492 and the current collector arm 450. In order to allow a limited relative movement between the controllable actuators 481, 482 and their attachment points during pivoting of the current control arm, the ends of each actuator are mounted in resilient bushings. A third actuator 493 is arranged to displace the current collector arm 450 about the vertical axis X. The third actuator 493 can be a rotary actuator with a drive axle 494 arranged in line with the vertical axis X, as indicated in FIG. 4. Alternatively, the third actuator can be a rotary actuator arranged to act on the collector arm via a gear arrangement, such as a bevel gear arrangement. A vertical plane in the transverse direction of the vehicle through the vertical axis X for transverse displacement can preferably, but not necessarily, intersect the horizontal axis Z of the pivot joint 490. In operation the third actuator 493 will cause the base member 491 and the current collector arm 450 to pivot about the vertical axis X, causing the pick-up unit 460 located remote from the vertical axis X to move in an arc in order to follow the current conductor 430 as the vehicle travels along the ERS road.

Figure 5:
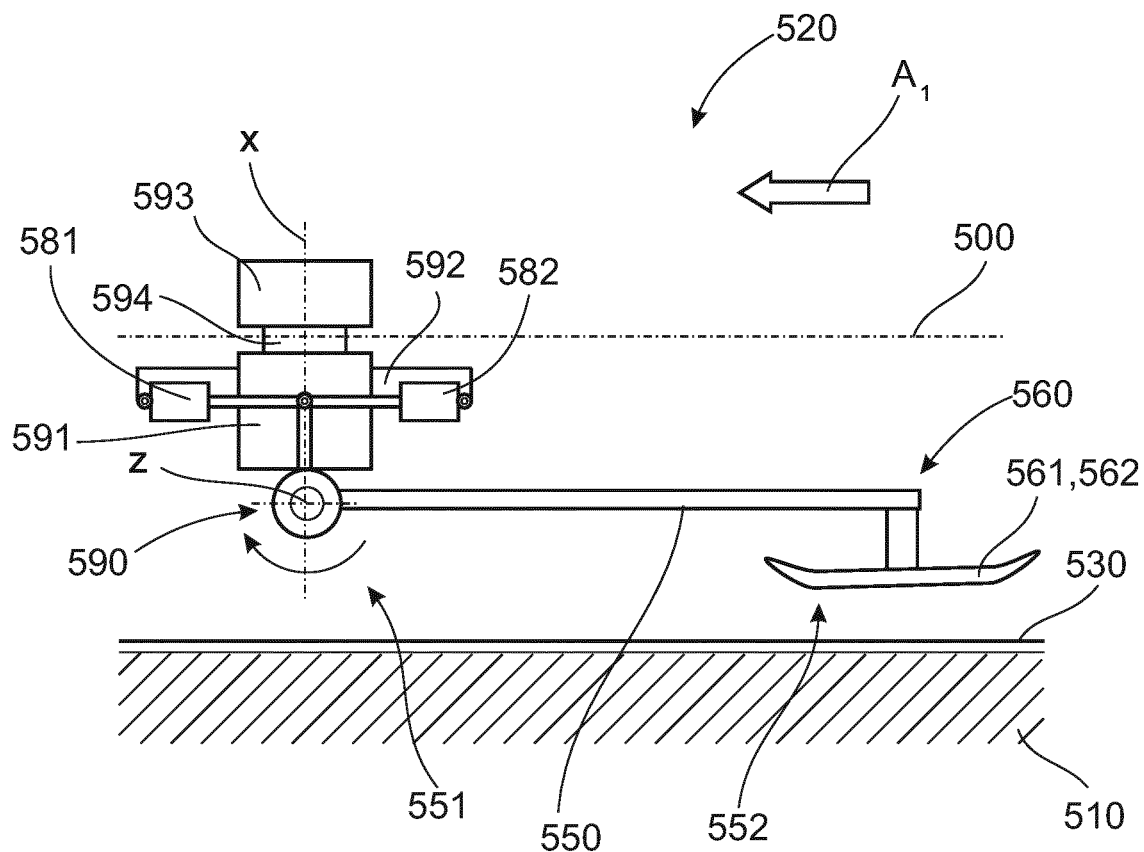
FIG. 5 shows a schematic side view of a current collector arrangement according to a second embodiment of the invention.

FIG. 5 shows a schematic side view of a current collector arrangement according to a second embodiment of the invention. FIG. 5 shows a current collector arrangement 520 arranged to be mounted on a schematically indicated vehicle 500 and to transmit electric power between a current conductor 530 located in the surface of a road 510 and the vehicle 500. The current conductor is preferably, but not necessarily located in a predetermined transverse position in the longitudinal direction of the road surface. The vehicle 500 is provided with means (not shown) for detecting and/or locating the position of the current conductor 530 relative to the vehicle and/or suitable road markers on or along the road. The current collector arrangement 520 comprises a displaceable current collector arm 550 that is arranged to be controllable for vertical and transverse displacement relative to a longitudinal axis of the vehicle 500. The longitudinal axis of the vehicle 500 extends in the main direction of forward movement of the vehicle, indicated by an arrow A1. A vertical downwards displacement is performed in order to place a pick-up unit 560 comprising contact elements 561, 562 mounted on a free end of the current collector arm 550 into contact the current conductor 530, in order to effect transmission of current. A vertical upwards displacement is performed in order to retract the current collector arm 550, when the current transmission has been interrupted. The current collector arrangement 520 comprises a first and a second controllable actuator 581, 582 arranged to effect the vertical displacement the current collector arm 550 and an electronic control unit (not shown) for controlling at least power transmission in and displacement of the current collector arm 550. The control unit is arranged to detect when the vehicle enters or leaves an ERS road and to initiate the power transmission after a completed deployment of the current collector arm 550 and to interrupt the power transmission prior to retraction of the current collector arm 550.

The first actuator 581 is arranged to lower the current collector arm 550 from a retracted position into a deployed position in contact with the current conductor 530. The second actuator 582 is arranged to lift current collector arm 550 from the deployed position into the retracted position. During a vertical displacement performed by one of the first or second actuators 581, 582 the other actuator 582, 581 is arranged to act as a damper. Accordingly, when the first actuator 581 is controlled to deploy the collector arm 550, the second actuator 582 is operated as a damper to absorb oscillations in the arm movement. Similarly, when the second actuator 582 is controlled to retract the collector arm 550, the first actuator 581 is operated as a damper. This arrangement is used for absorbing oscillations of the current collector arm 550 supporting the current collecting pick-up unit 560 during displacement.

The current collector arrangement 520 according to the first embodiment of the invention is provided with a current collector arm 550 that comprises a longitudinal component having a horizontal pivot joint 590 at a first end 551 and a pick-up unit at a second end 552. The controllable actuators 581, 582 arranged to effect the vertical displacement the current collector arm 550 are mounted in contact with an extension 553 of the current collector arm 550 on the other side of the pivot joint 590 relative to the second end 552 of the current collector arm 550. The extension 553 of the current collector arm is arranged at a suitable angle relative to the main part of the current collector arm 550. In the example shown in FIG. 5 the extension 553 is arranged at right angles to the current collector arm 550. This angle can be selected depending on the available packaging space for the actuators. For instance, if vertical space is limited then the extension can be arranged at right angles to the longitudinal direction of the current collector arm, allowing a substantially horizontal placement for at least the first and second actuators. Alternatively, the extension can extend in the direction of the longitudinal axis of the main part of the current collector arm 550.

The pivot joint 590 is attached to the lower end of a base member 591 that is attached to the vehicle and is rotatable about a vertical axis X. A support member 592 is attached to the upper end of the base member 591 and extends in front of and to the rear of the base member 591. The controllable actuators 581, 582 are attached between the front and rear ends of the support member 592 and the extension 553 of current collector arm 550, located between the said ends. In order to allow a limited relative movement between the controllable actuators 581, 582 and their attachment points during pivoting of the current control arm, the ends of each actuator are mounted in resilient bushings. A third actuator 593 is arranged to displace the current collector arm 550 about the vertical axis X. The third actuator 593 can be a rotary actuator with a drive axle 594 arranged in line with the vertical axis X, as indicated in FIG. 5. Alternatively, the third actuator can be a rotary actuator arranged to act on the collector arm via a gear arrangement, such as a bevel gear arrangement. A vertical plane in the transverse direction of the vehicle through the vertical axis X for transverse displacement can preferably, but not necessarily, intersect the horizontal axis Z of the pivot joint 590. In operation the third actuator 593 will cause the base member 591 and the current collector arm 550 to pivot about the vertical axis X, causing the pick-up unit 560 located remote from the vertical axis X to move in an arc in order to follow the current conductor 530 as the vehicle travels along the ERS road.

Figure 6:
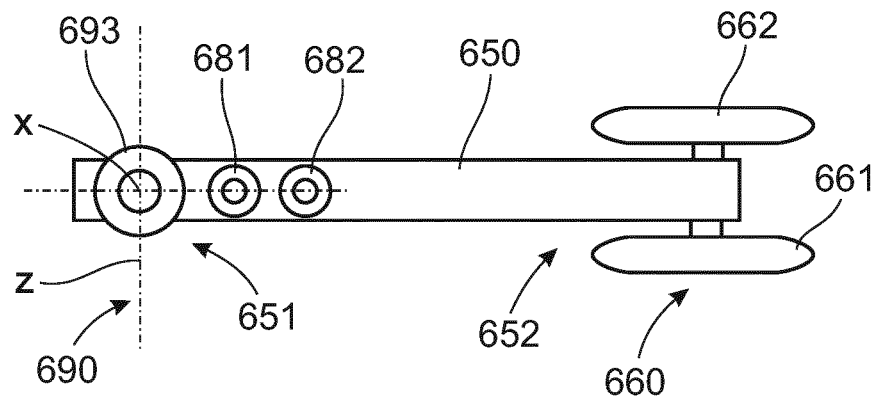
FIG. 6 shows a schematic plan view of a current collector arm with a first actuator arrangement.

FIG. 6 shows a schematic plan view of a current collector arm 650 with a first actuator arrangement. In this example the current collector arm 650 comprises a horizontal pivot joint 690 at a first end 651 and a pick-up unit 660 at a second end 652. The controllable first and second actuators 681, 682 arranged to effect the vertical displacement the current collector arm 650 are located intermediate the first and second ends 651, 652. A third actuator 693 is provided at said first end 652 to allow the current collector arm 650 to be pivoted about a vertical axis X. In this example the first and second actuators 681, 682 are located in line between the first and second ends of the current collector arm, as indicated in FIG. 4.

Figure 7:
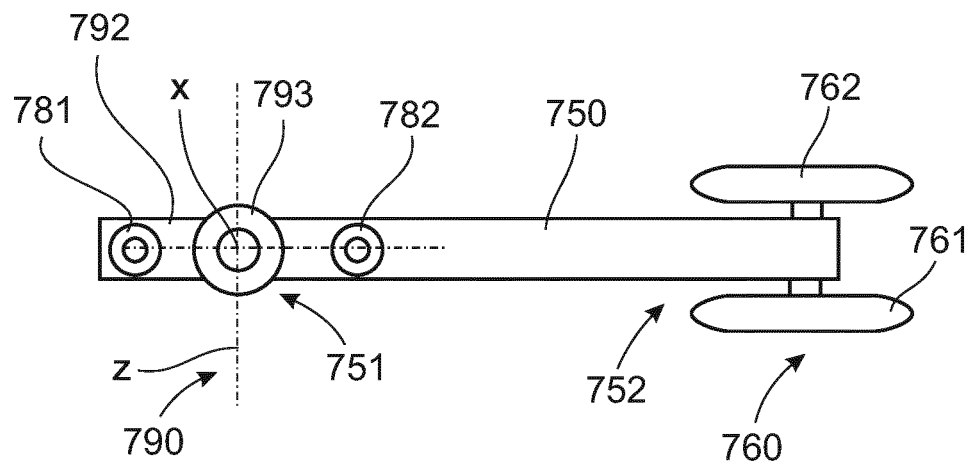
FIG. 7 shows a schematic plan view of a current collector arm with a second actuator arrangement.

FIG. 7 shows a schematic plan view of a current collector arm 750 with a second actuator arrangement. In this example the current collector arm 750 comprises a horizontal pivot joint 790 at a first end 751 and a pick-up unit 760 at a second end 752. A first actuator 781 is located on the opposite side of the horizontal pivot joint 790 relative to a second actuator 782. A third actuator 793 is provided at said first end 752 to allow the current collector arm 750 to be pivoted about a vertical axis X. In this example the first actuator 781 is located in contact with an extension 792 of the current collector arm 750 on the other side of the pivot joint 790 relative to the second end 752 of the current collector arm 750. The extension 792 of the current collector arm 750 can extend in the longitudinal axis of the main part of the arm, as shown in FIG. 7.

Figure 8:
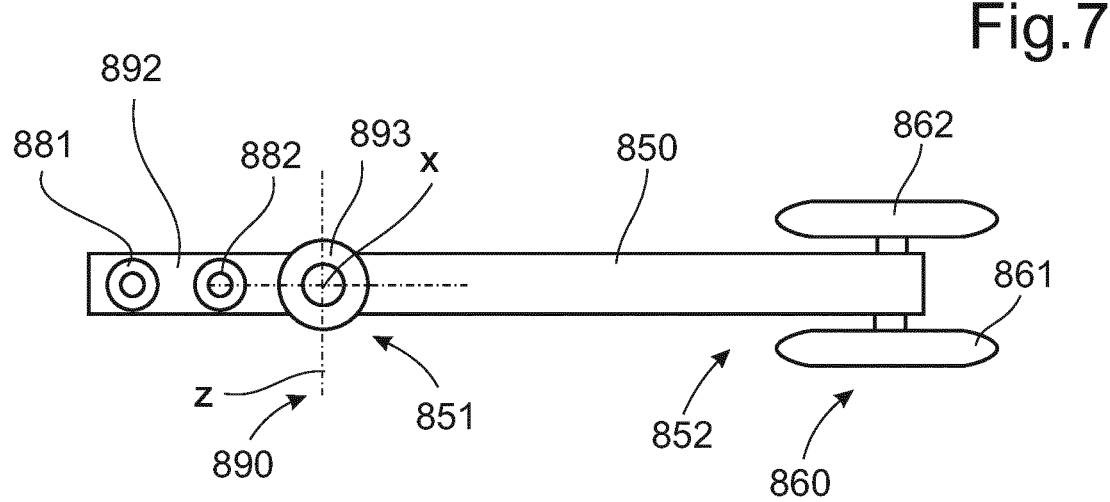
FIG. 8 shows a schematic plan view of a current collector arm with a third actuator arrangement.

FIG. 8 shows a schematic plan view of a current collector arm 850 with a third actuator arrangement. In this example the current collector arm comprises a horizontal pivot joint 890 at a first end 851 and a pick-up unit 860 at a second end 852. The controllable first and second actuators 881, 882 arranged to effect the vertical displacement the current collector arm 850 are both located on the opposite side of the horizontal pivot joint 690 relative to the second end 852 of the current collector arm 850. A third actuator 893 is provided at said first end 852 to allow the current collector arm 850 to be pivoted about a vertical axis X. In this example the first and second actuators are located in contact with an extension 893 of the current collector arm 850 on the other side of the pivot joint 890 relative to the second end 852 of the current collector arm 850. The extension 892 of the current collector arm 850 can extend in the longitudinal axis of the main part of the arm, as shown in FIG. 8. Alternatively, the extension can be arranged at a suitable angle relative to the main part of the arm, as indicated in FIG. 5.

Figure 9:
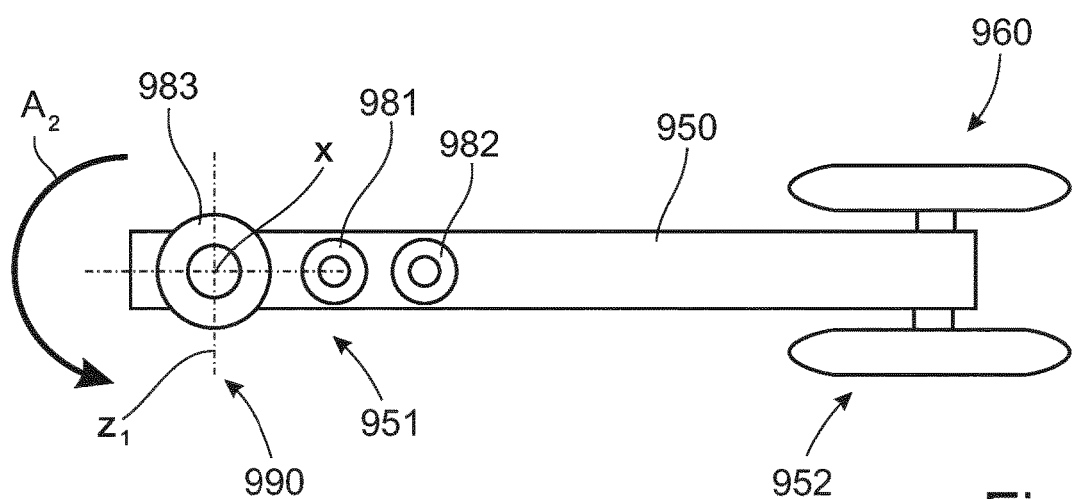
FIG. 9 shows a schematic plan view of a current collector arm 850 with a first example of an actuator for transverse displacement.

FIG. 9 shows a schematic plan view of a current collector arm 950 with a first example of an actuator for transverse displacement. In this example the current collector arm 950 comprises a horizontal pivot joint 990 at a first end 951 and a pick-up unit 960 at a second end 952. Two controllable first and second actuators 981, 982 arranged to effect the vertical displacement the current collector arm 950 are located intermediate the first and second ends 951, 952. According the example in FIG. 9 a third actuator 983 is arranged to displace the collector arm 950 about a vertical axis X. The third actuator 983 is a rotary actuator with a drive axle arranged in line with the vertical axis. Alternatively, a rotary actuator can be arranged to act on the collector arm via a gear arrangement, such as a bevel gear arrangement. A vertical plane in the transverse direction of the vehicle can preferably, but not necessarily, intersect the horizontal axis Z1 of the pivot joint 990. In operation the third actuator will cause the current collector arm to pivot about the vertical axis, as indicated by the arrow A2, causing the pick-up unit 960 located remote from the vertical axis to move in an arc in order to follow a current conductor, as described in connection with FIG. 3.

Figure 10:
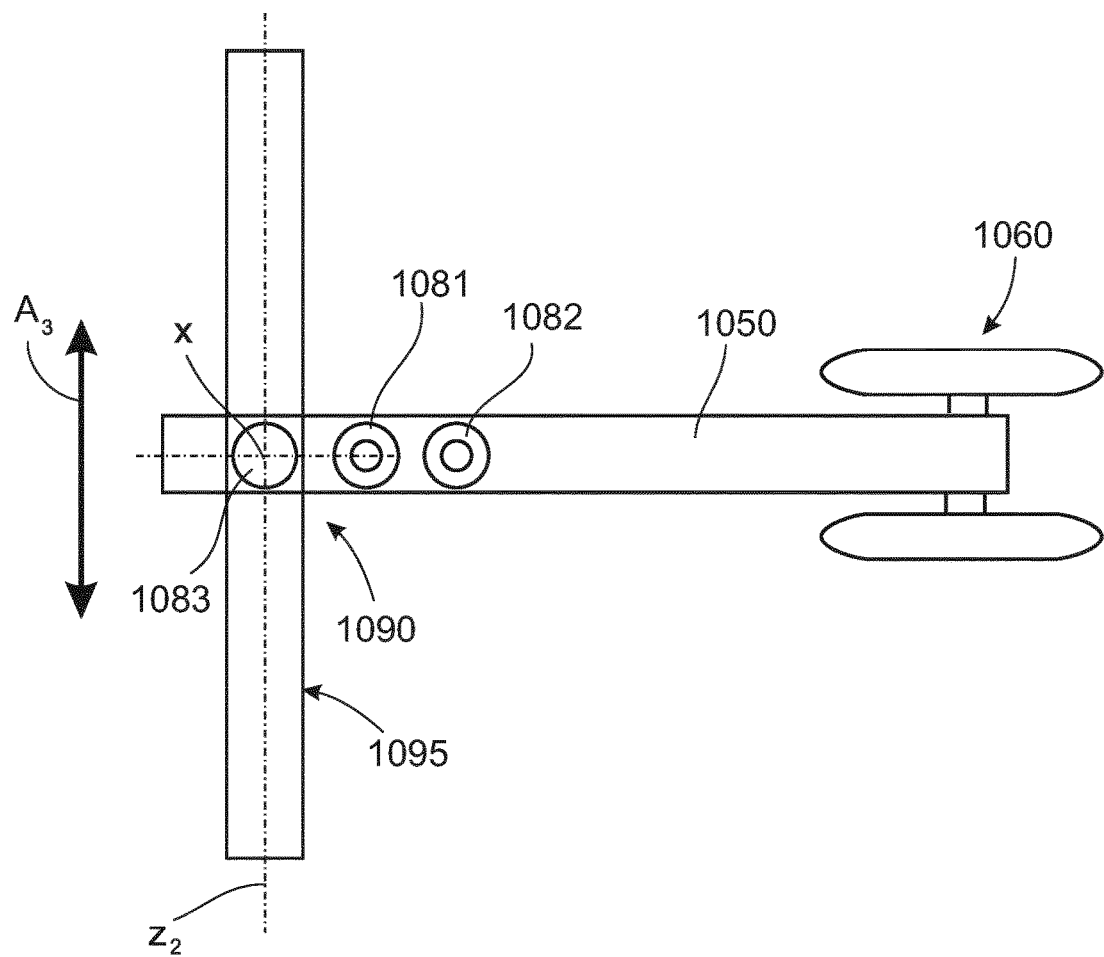
FIG. 10 shows a schematic plan view of a current collector arm 850 with a second example of an actuator for transverse displacement.

FIG. 10 shows a schematic plan view of a current collector arm 1050 with a second example of an actuator for transverse displacement In this example the current collector arm 1050 comprises a horizontal pivot joint 1090 at a first end 1051 and a pick-up unit 1060 at a second end 1052. Two controllable first and second actuators 1081, 1082 arranged to effect the vertical displacement the current collector arm 1050 are located intermediate the first and second ends 1051,1052. According to the example in FIG. 10 the third actuator 1093 is arranged to displace the collector arm 1050 along a guide arrangement at right angles to the longitudinal axis of the vehicle. In this example, the third actuator 1093 is a rotary actuator arranged to act on the collector arm via a gear arrangement, such as a rack-and-pinion gear arrangement 1095. Alternatively, the collector arm can be displaced by means of a suitable linear actuator. A vertical plane through the guide for transverse displacement can preferably, but not necessarily, intersect the horizontal axis Z2 of the pivot joint 1090. In operation the third actuator 1083 will cause the current collector arm to be displaced along the transverse guide, as indicated by the arrow A3, causing the pick-up unit 1060 located remote from the guide to move transversely across the surface of the road in order to follow the current conductor, as described in connection with FIG. 2.

The transverse actuators indicated in FIGS. 9 and 10 are described for a current collector arm as shown in FIG. 6. However, both actuators are equally applicable to any one of the above embodiments and examples.

Figure 11:
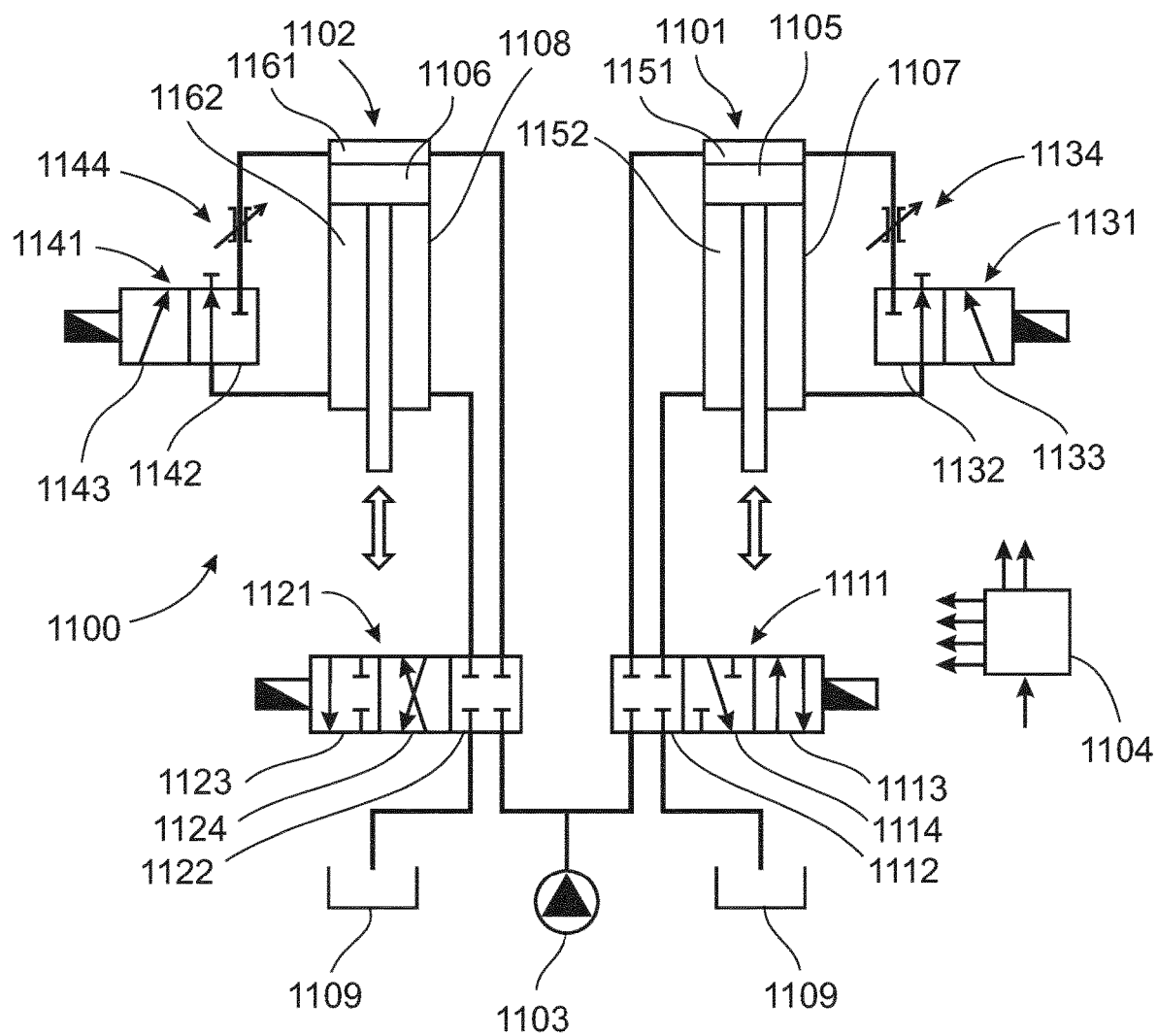
FIG. 11 shows a schematic diagram of a fluid circuit for controlling a current collector arrangement according to the invention.

According to the invention at least one of the first and second actuators as described in the above figures can be a fluid actuator, such as a pneumatic or hydraulic actuator. Alternatively, at least one of the actuators can be an electric actuator. The selection of suitable actuators can be made on the basis of factors such as size and weight of the current collector arm, expected oscillation forces to be dampened, available power sources on the vehicle, etc. For instance, in a commercial transport vehicle the preferred actuator would be pneumatic, as compressed air is usually available in this type of vehicle. Also, pneumatic actuators would be advantageous in this case due to the dampening forces required to handle the size and weight of a current collector arm used in this type of vehicle FIG. 11 shows a schematic diagram of a fluid circuit 1100 for controlling a current collector arrangement according to the invention. FIG. 11 shows an example of a circuit suitable for controlling a first and a second actuator 1101, 1102 during deployment and retraction of a current collector arm (not shown). FIG. 11 shows the fluid actuators and their controlling valves when the current collector arm is held in its retracted position.

The first actuator 1101 is arranged to lower the collector arm from the retracted position into a deployed position in contact with a current conductor (not shown). The current collector arrangement further comprises a second actuator 1102 arranged to the lift the collector arm from the deployed position into the retracted position. During a vertical displacement performed by one of the first or second actuators the other actuator is arranged to act as a damper. Accordingly, when the first actuator 1101 is controlled to deploy the collector arm, the second actuator 1102 is operated as a damper to absorb oscillations in the arm movement. Similarly, when the second actuator 1102 is controlled to retract the collector arm, the first actuator 1101 is operated as a damper. The fluid circuit 1100 comprises a source of fluid pressure in the form of a pump 1103, which pump can supply fluid pressure to either actuator. Each actuator 1101, 1102 is connected to the pump 1103 via a first and a second controllable valve 1111, 1121, respectively, which controllable valves are provided with solenoids controlled by an electronic control unit (ECU) 1104. Each actuator 1101, 1102, comprises a displaceable piston 1105, 1106 located in a respective cylinder 1107, 1108. Each piston 1105, 1106 divides the respective cylinder 1107, 1108 into a first chamber 1151; 1162 and a second chamber 1152; 1162, respectively. The first chambers 1151; 1162 and the second chambers 1152; 1162 are connected by a further controllable valve 1131; 1141, respectively, each in series with a respective throttle 1134; 1144.

In operation, it is first determined that the vehicle has entered an ERS road and that the collector arm should be moved from the retracted position into the deployed position in contact with a current conductor. A signal is transmitted to the ECU 1104 which will in turn transmit signals to the first and second controllable valves 1111 and 1121 to displace them from their respective closed position 1112, 1122 into a first active position 1113, 1123. When placed in its first active position 1113, the first controllable valve 1111 will supply fluid pressure from the pump 1103 to the first chamber 1151 of the first actuator 1101, causing the current collector arm to be deployed downwards. The second controllable valve 1121 is displaced to its first active position 1123, wherein the second chamber 1162 of the second actuator 1102 is connected to drain 1109 to release any excess pressure from the second chamber 1162 of the second actuator 1102. Simultaneously, the further controllable valve 1141 associated with the second actuator 1102 is controlled to move from a closed position 1142 to an open position 1143, in order to allow fluid to flow from the second chamber 1162 to the first chamber 1161 of the second actuator 1102 during displacement of the second piston 1106. The second piston 1106 is displaced passively under the action of the first actuator 1101. Any sudden jerks or oscillations induced into the current collector arm during deployment are dampened by the throttle 1144, which can be a fixed or variable flow throttle.

When the current collector arm reaches its end position in contact with a current conductor, the pressure applied by the first actuator will cause a downward force ensuring a sufficient contact force with the conductor.

Subsequently, it can be determined that the vehicle is about to leave the ERS road and that the collector arm should be moved from the deployed position into the retracted position. Alternatively, a retraction can also be initiated if an obstacle is detected on the conductor, requiring retraction of the control arm or evasive action of the vehicle. A signal is transmitted to the ECU 1104 which will in turn transmit signals to the first and second controllable valves 1111 and 1121 to displace them from their respective first active position 1113, 1123 into a second active position 1114, 1124. When placed in its second active position 1114, the second controllable valve 1121 will supply fluid pressure from the pump 1103 to the second chamber 1162 of the second actuator 1102, causing the current collector arm to be retracted upwards. The first controllable valve 1111 is displaced to its second active position 1114, wherein the first chamber 1151 of the first actuator 1101 is connected to drain 1109 to release any excess pressure from the first chamber 1151 of the second actuator 1102. Simultaneously, the further controllable valve 1131 associated with the first actuator 1101 is controlled to move from a closed position 1132 to an open position 1133, in order to allow fluid to flow from the first chamber 1151 to the second chamber 1152 of the first actuator 1101 during displacement of the first piston 1105. The first piston 1105 is displaced passively under the action of the second actuator 1102. Any sudden jerks or oscillations induced into the current collector arm during deployment are dampened by the throttle 1134, which can be a fixed or variable flow throttle.

When the current collector arm reaches its retracted position adjacent the vehicle, the ECU 1104 will transmit signals to the first and second controllable valves 1111 and 1121 to displace them from their respective first active positions 1114, 1124 into their closed positions 1112, 1122.

The fluid circuit shown in FIG. 11 is only an example of a possible circuit arrangement for controlling the first and second actuators in a current collector arrangement according to the invention. The circuit shown is only intended to illustrate a working example and alternative fluid and electric circuits are possible within the scope of the appended claims For instance, in FIG. 11 both the piston-cylinder arrangements are shown placed in the same direction. However, in order to maximize the surface area of the piston subjected to hydraulic pressure it can be advantageous to mount the second actuator in the opposite direction to that shown in FIG. 11. The latter arrangement is advantageous over, for instance, double acting pistons, which will have a reduced actuating force in one direction due to the cross-sectional area of the piston rod. Further, in order to allow for rapid, emergency retraction it can also be possible to provide a circuit that allows both actuators to be used during retraction.

It is to be understood that the present invention is not limited to the embodiments described above and illustrated in the drawings; rather, the skilled person will recognize that many changes, variants and modifications may be made within the scope of the appended claims.

The invention claimed is:

1. A current collector arrangement arranged to be mounted on a vehicle and to transmit electric power between a current conductor located in a surface of a road and the vehicle, wherein the current collector arrangement comprises:
   a current collector arm, being controllable for a vertical displacement relative to a longitudinal axis of the vehicle to allow power transmission from the current conductor
   an electronic control unit, for controlling the power transmission and the vertical displacement of the current collector arm;
   a first actuator, being configured to lower the current collector arm from a retracted position into a deployed position for transmitting electric power from the current conductor to the current collector arm; and
   a second actuator, being configured to lift the current collector arm from the deployed position into the retracted position;
   wherein, during the vertical displacement by the first actuator, the second actuator is configured to act as a damper, and during the vertical displacement by the second actuator, the first actuator is configured to act as a damper.

2. The current collector arrangement according to claim 1, wherein the current collector arm comprises a longitudinal component having a horizontal pivot joint at a first end and a pick-up unit at a second end.

3. The current collector arrangement according to claim 2, wherein the current collector arm comprises an attachment point for at least one of the first and the second actuators intermediate the first and second ends.

4. The current collector arrangement according to claim 2, wherein the current collector arm comprises an attachment point for at least one of the first and second actuators on the opposite side of the horizontal pivot joint relative to the other actuator.

5. The current collector arrangement according to claim 2, wherein the current collector arm comprises attachment points for at least one of the first and second actuators on opposite sides of the horizontal pivot joint.

6. The current collector arrangement according to claim 1, wherein the current collector arm is configured to be controllable for vertical and transverse displacement relative to a longitudinal axis of the vehicle.

7. The current collector arrangement according to claim 1, wherein that the current collector arrangement comprises a third actuator to displace the current collector arm in a transverse direction to track the current conductor.

8. The current collector arrangement according to claim 7, wherein the third actuator is configured to displace the current collector arm about a vertical axis.

9. The current collector arrangement according to claim 8, wherein the third actuator is a rotary actuator configured in line with the vertical axis.

10. The current collector arrangement according to claim 8, wherein the third actuator is a rotary actuator configured to act on the current collector arm via a gear arrangement.

11. The current collector arrangement according to claim 7, wherein the third actuator is configured to displace the current collector arm along a guide arrangement at right angles to the longitudinal axis of the vehicle.

12. The current collector arrangement according to claim 1, wherein at least one of the first and the second actuators is a fluid actuator.

13. The current collector arrangement according to claim 1, wherein at least one of the first and the second actuators is a pneumatic actuator.

14. The current collector arrangement according to claim 1, wherein at least one of the first and the second actuators is an electric actuator.

15. The current collector arrangement according to claim 1, wherein the current collector arm comprises a conductive current collector and is configured to contact the current conductor in the deployed position.

16. The current collector arrangement according to claim 15, wherein the first actuator is configured to maintain a predetermined contact pressure on the current collector arm during the power transmission.

17. The current collector arrangement according to claim 15, wherein the electronic control unit is configured to inhibit the power transmission in the current collector arm immediately prior to a deployment and retraction.

18. The current collector arrangement according to claim 1, wherein the current collector arm comprises an inductive current collector and is configured to be maintained at a predetermined distance from the current conductor in the deployed position.

19. The current collector arrangement according to claim 18, wherein the predetermined distance is selected depending on one or more operating conditions.

20. A vehicle, wherein the vehicle comprises a current collector arrangement according to claim 1.

* * * * *